(12) United States Patent
Lee et al.

(10) Patent No.: US 12,374,489 B2
(45) Date of Patent: Jul. 29, 2025

(54) MULTILAYER ELECTRONIC COMPONENT

(71) Applicant: SAMSUNG ELECTRO-MECHANICS CO., LTD., Suwon-si (KR)

(72) Inventors: Kangha Lee, Suwon-si (KR); Yoona Park, Suwon-si (KR); Jin Hyung Lim, Suwon-si (KR); Chul Seung Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 147 days.

(21) Appl. No.: 18/374,313

(22) Filed: Sep. 28, 2023

(65) Prior Publication Data

US 2024/0177929 A1    May 30, 2024

(30) Foreign Application Priority Data

Nov. 30, 2022 (KR) .......................... 10-2022-0164541

(51) Int. Cl.
| | |
|---|---|
| *H01G 4/30* | (2006.01) |
| *H01G 4/008* | (2006.01) |
| *H01G 4/012* | (2006.01) |
| *H01G 4/12* | (2006.01) |
| *H01G 4/232* | (2006.01) |

(52) U.S. Cl.
CPC .............. *H01G 4/12* (2013.01); *H01G 4/008* (2013.01); *H01G 4/012* (2013.01); *H01G 4/232* (2013.01); *H01G 4/30* (2013.01)

(58) Field of Classification Search
None
See application file for complete search history.

(56) References Cited

U.S. PATENT DOCUMENTS

| | | | |
|---|---|---|---|
| 10,068,710 B2* | 9/2018 | Nishisaka | ............ H01G 4/2325 |
| 2009/0323253 A1 | 12/2009 | Kobayashi et al. | |
| 2012/0057272 A1 | 3/2012 | Hirata et al. | |
| 2017/0018362 A1 | 1/2017 | Nishisaka et al. | |

(Continued)

FOREIGN PATENT DOCUMENTS

| | | | | |
|---|---|---|---|---|
| EP | 2192630 A1 | 6/2010 | | |
| JP | 2019009359 A | * | 1/2019 | ............... H01G 2/06 |

(Continued)

OTHER PUBLICATIONS

Extended European Search Report issued Apr. 29, 2024 for European Patent Application No. 23198783.5.

*Primary Examiner* — Dion R. Ferguson
(74) *Attorney, Agent, or Firm* — Morgan Lewis & Bockius LLP

(57) ABSTRACT

In an embodiment of the present disclosure, among a plurality of crystal grains included in first electrode layers, crystal grains disposed on an end of the dielectric layer in the second direction and in contact with the second electrode layers are defined as first crystal grains and crystal grains disposed on ends of the internal electrodes in the second direction and in contact with the second electrode layers are defined as second crystal grains, and a growth direction of the first crystal grains and a growth direction of the second crystal grains may be adjusted, so that bonding force between the first electrode layers and the body may be improved.

20 Claims, 7 Drawing Sheets

(56) References Cited

U.S. PATENT DOCUMENTS

| | | | |
|---|---|---|---|
| 2017/0345568 A1* | 11/2017 | Sakatsume | H01G 4/1236 |
| 2019/0031565 A1 | 1/2019 | Nakamura et al. | |
| 2020/0066449 A1 | 2/2020 | Tsutsumi et al. | |
| 2021/0327645 A1 | 10/2021 | Takahashi | |
| 2021/0366657 A1 | 11/2021 | Sakai | |
| 2022/0102079 A1 | 3/2022 | Kitahara et al. | |
| 2022/0293344 A1 | 9/2022 | Iguchi et al. | |
| 2024/0177929 A1* | 5/2024 | Lee | H01G 4/12 |
| 2024/0212936 A1* | 6/2024 | Jung | H01G 4/2325 |
| 2024/0222032 A1* | 7/2024 | An | H01G 2/12 |

FOREIGN PATENT DOCUMENTS

| | | | | |
|---|---|---|---|---|
| JP | 2019009362 A | * | 1/2019 | H01G 2/06 |
| JP | 2021-158258 A | | 10/2021 | |
| KR | 10-2017-0009724 A | | 1/2017 | |
| KR | 10-2426098 B1 | | 7/2022 | |
| WO | 2018/220901 A1 | | 12/2018 | |

\* cited by examiner

MULTILAYER ELECTRONIC COMPONENT

CROSS-REFERENCE TO RELATED APPLICATION(S)

This application claims benefit of priority to Korean Patent Application No. 10-2022-0164541 filed on Nov. 30, 2022 in the Korean Intellectual Property Office, the disclosure of which is incorporated herein by reference in its entirety.

TECHNICAL FIELD

The present disclosure relates to a multilayer electronic component.

BACKGROUND

A multilayer ceramic capacitor (MLCC), a multilayer electronic component, may be a chip-type condenser mounted on the printed circuit boards of any of various types of electronic products, such as an image display device, including a liquid crystal display (LCD) or a plasma display panel (PDP), a computer, a smartphone, or a mobile phone, serving to charge or discharge electricity therein or therefrom.

In general, an external electrode of a multilayer ceramic capacitor may include a conductive metal and glass. Accordingly, bonding force between a ceramic component of a capacitor body and internal electrodes may be secured. When external electrodes, internal electrodes, and dielectric layers are formed thinly for miniaturization and high capacitance of the multilayer ceramic capacitor, the bonding force between the external electrodes and the body may deteriorate due to the lack of absolute glass content in the external electrodes, and the density of the external electrodes may decrease. Thus, a permeation path of external moisture or plating solution may be formed. In order to solve this problem, when a glass content of the external electrode is increased, a problem of deterioration in contact and connectivity between the conductive metal of the external electrode and the internal electrodes may occur.

In order to improve this, an attempt has been made to secure connectivity between the internal electrode and the external electrode by directly forming external electrodes on a surface of a body using a plating method after sintering the body of the capacitor. However, due to the characteristics of the plating method, the bonding force between the body and the external electrode is still insufficient due to the weak bonding force with a non-conductive dielectric layer.

SUMMARY

An aspect of the present disclosure is to solve a problem of deterioration in bonding force between a first electrode layer and a body, which may occur as a growth direction of crystal grains is different on an end of a dielectric layer and on ends of internal electrodes, when a first electrode layer including the crystal grains on third and fourth surfaces of the body.

However, the object of the present disclosure is not limited to the above, and will be more easily understood in the process of describing specific embodiments of the present disclosure.

According to an aspect of the present disclosure, a multilayer electronic component includes: a body including a dielectric layer and internal electrodes alternately disposed with the dielectric layer interposed therebetween in a first direction, the body having first and second surfaces opposing each other in the first direction, third and fourth surfaces connected to the first and second surfaces and opposing each other in a second direction, and fifth and sixth surfaces connected to the first to fourth surfaces and opposing each other in a third direction; a first electrode layer disposed on the third and fourth surfaces and disposed between an extension line of the first surface and an extension line of the second surface; and a second electrode layer disposed on the first electrode layer, wherein the first electrode layer includes a first crystal grain disposed on an end of the dielectric layer in the second direction and in contact with the second electrode layer, and a second crystal grain disposed on ends of the internal electrodes in the second direction and in contact with the second electrode layer, wherein, when an angle formed by a growth direction of the first crystal grain and an extension line of the third surface or the fourth surface is referred to as a first angle, and an angle formed by a growth direction of the second crystal grain and an extension line of the third surface or the fourth surface is referred to as a second angle, and an absolute value of a difference between an average value of the first angle and an average value of the second angle is 20 degrees or less.

According to another aspect of the present disclosure, a multilayer electronic component includes: a body including a dielectric layer and internal electrodes alternately disposed with the dielectric layer interposed therebetween in a first direction, the body having first and second surfaces opposing each other in the first direction, third and fourth surfaces connected to the first and second surfaces and opposing each other in a second direction, and fifth and sixth surfaces connected to the first to fourth surfaces and opposing each other in a third direction; a first electrode layer disposed on the third and fourth surfaces; and a second electrode layer disposed on the first electrode layer, wherein the first electrode layer includes a first crystal grain disposed on an end of the dielectric layer in the second direction and in contact with the second electrode layer and a second crystal grain disposed on ends of the internal electrodes in the second direction and in contact with the second electrode layer, both of the first crystal grain and the second crystal grain have an elongated shape extending in a direction substantially parallel to the second direction between the third or fourth surface of the body and an inner surface of the second electrode layer.

BRIEF DESCRIPTION OF DRAWINGS

The above and other aspects, features, and advantages of the present disclosure will be more clearly understood from the following detailed description, taken in conjunction with the accompanying drawings.

DETAILED DESCRIPTION

Figure 1:
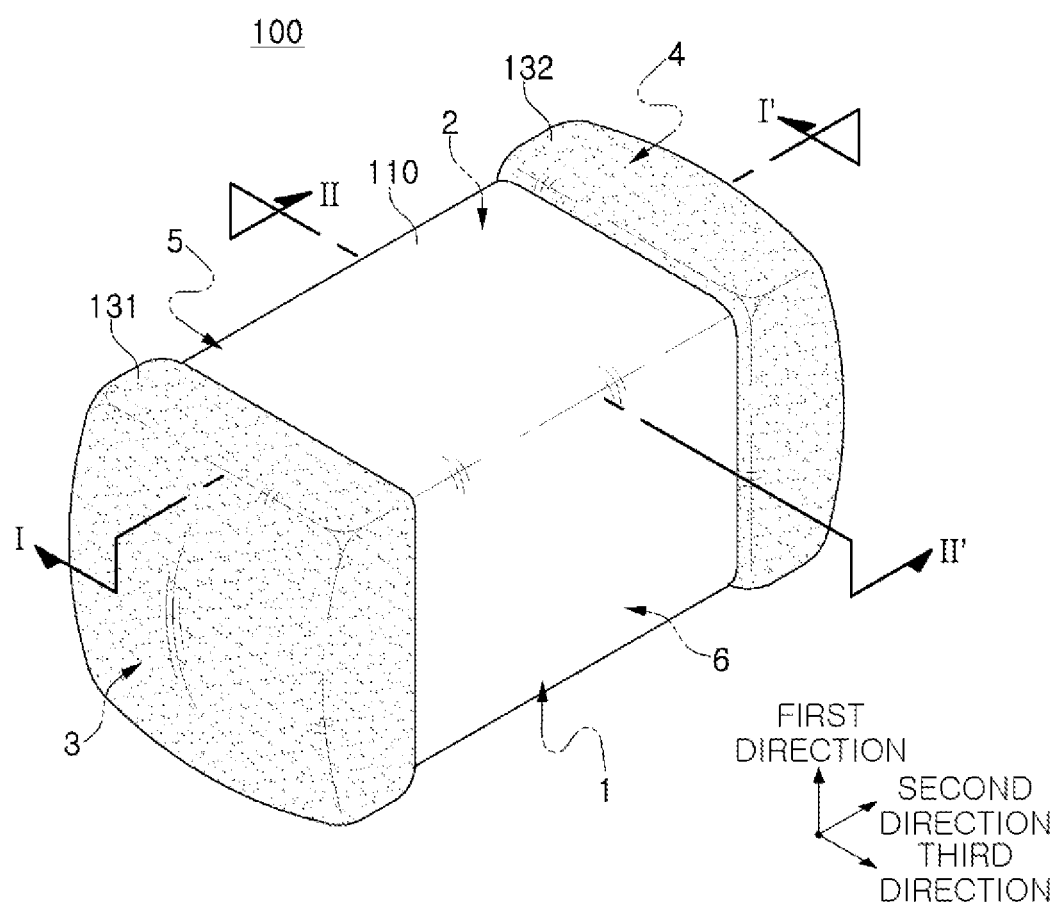
FIG. 1 is a perspective view illustrating a multilayer electronic component according to an embodiment of the present disclosure.

Hereinafter, embodiments of the present disclosure will be described as follows with reference to the attached drawings. The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art. Accordingly, shapes and sizes of elements in the drawings may be exaggerated for clear description, and elements indicated by the same reference numeral are the same elements in the drawings.

In the drawings, irrelevant descriptions will be omitted to clearly describe the present disclosure, and to clearly express a plurality of layers and areas, thicknesses may be magnified. The same elements having the same function within the scope of the same concept will be described with use of the same reference numerals. Throughout the specification, when a component is referred to as "comprise" or "comprising," it means that it may further include other components as well, rather than excluding other components, unless specifically stated otherwise.

In the drawings, a first direction may be defined as a direction in which first and second internal electrodes are alternately disposed with a dielectric layer interposed therebetween or a thickness (T) direction, and among second and third directions, perpendicular to the first direction, the second direction may be defined as a length (L) direction, and the third direction may be defined as a width (W) direction.

FIG. 1 is a perspective view illustrating a multilayer electronic component according to an embodiment of the present disclosure.

Figure 2:
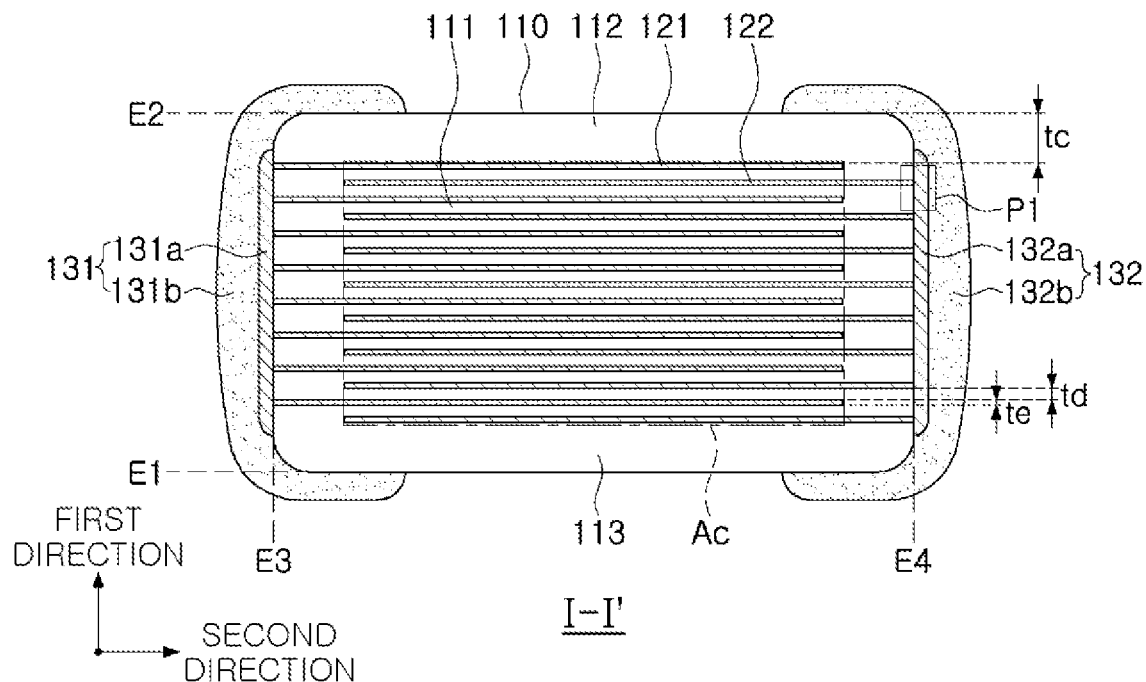
FIG. 2 is a cross-sectional view taken along line I-I' of FIG. 1.

FIG. 2 is a cross-sectional view taken along line I-I' of FIG. 1.

Figure 3:
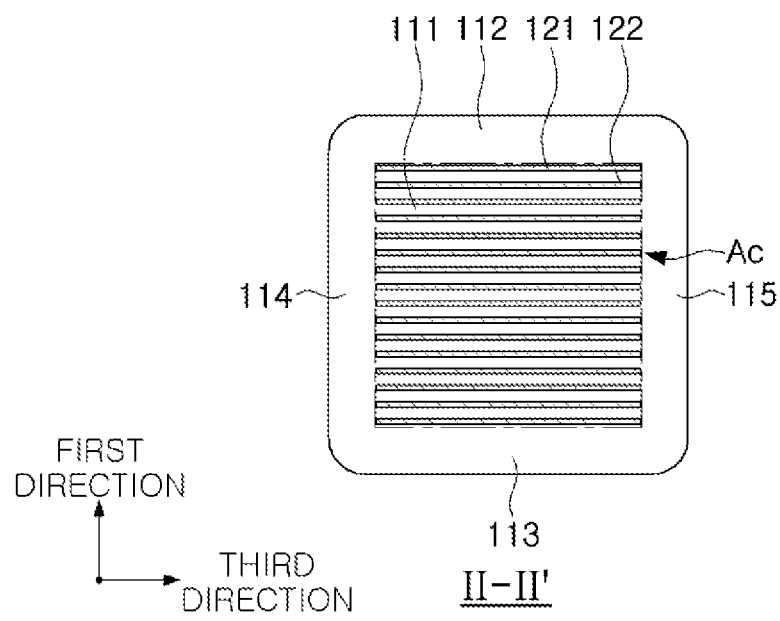
FIG. 3 is a cross-sectional view taken along line II-II' of FIG. 1.

FIG. 3 is a cross-sectional view taken along line II-II' of FIG. 1.

Figure 4:
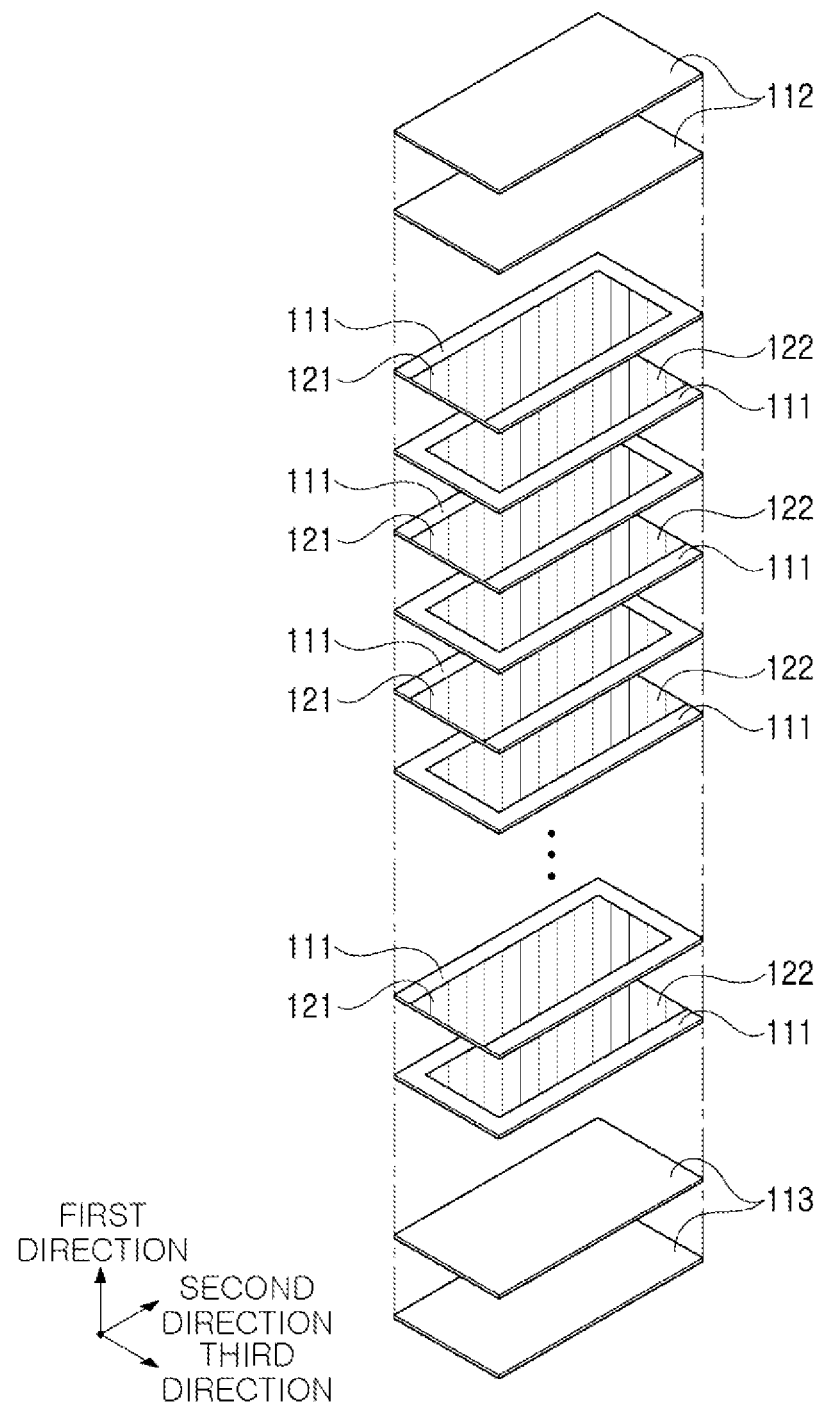
FIG. 4 is an exploded perspective view illustrating a body of a multilayer electronic component according to an embodiment of the present disclosure.

FIG. 4 is an exploded perspective view illustrating a body of a multilayer electronic component according to an embodiment of the present disclosure.

Figure 5:
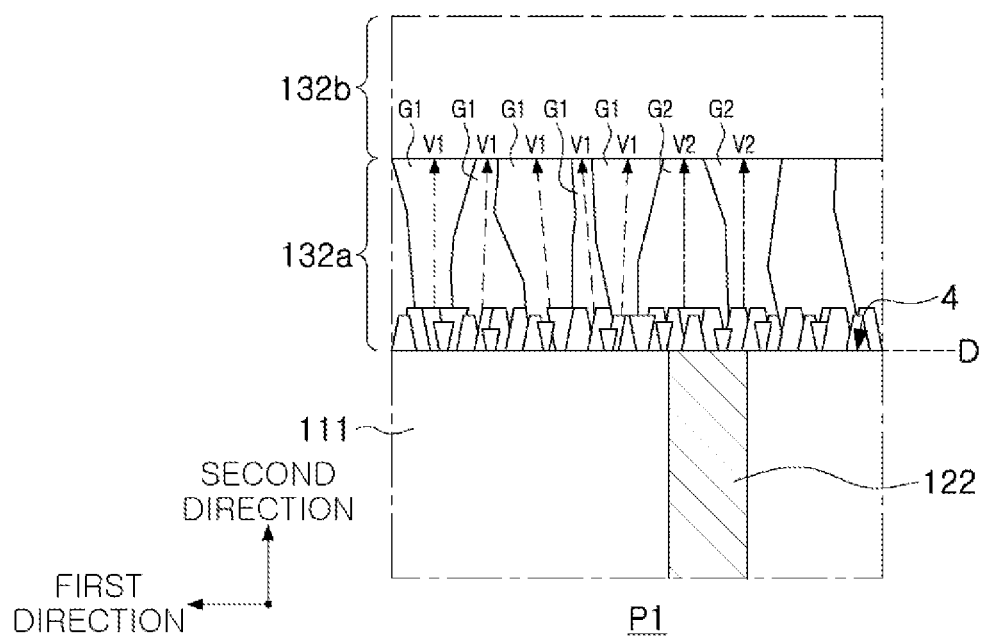
FIG. 5 is an enlarged view of region P1 of FIG. 2.

FIG. 5 is an enlarged view of region P1 of FIG. 2.

FIGS. 6 (a) and 6(b) are schematic diagrams schematically illustrating a method of measuring a growth direction of a first crystal grain and a growth direction of a second crystal grain according to an embodiment of the present disclosure.

Hereinafter, a multilayer electronic component 100 according to an embodiment of the present disclosure will be described with reference to FIGS. 1 to 6(b).

The multilayer electronic component 100 according to an embodiment of the present disclosure includes: a body 110 including a dielectric layer 111 and internal electrodes 121 and 122 alternately disposed with the dielectric layer 111 in a first direction, the body 110 having first and second surfaces 1 and 2 opposing each other in a first direction, third and fourth surfaces 3 and 4 connected to the first and second surfaces and opposing each other in a second direction, and fifth and sixth surfaces 5 and 6 connected to the first to fourth surfaces 1, 2, 3, and 4 and opposing each other in a third direction; first electrode layers 131a and 132a disposed on the third and fourth surfaces 3 and 4 and disposed on an extension line E1 of the first surface and an extension line E2 of the second surface, and second electrode layers 131b and 132b disposed on the first electrode layers 131a and 132a, wherein the first electrode layers 131a and 132a include first crystal grains G1 and G1' disposed on an end of the dielectric layer 111 in a second direction and in contact with the second electrode layers 131b and 132b, and second crystal grains G2 and G2' disposed on ends of the internal electrodes 121 and 122 in a second direction and in contact with the second electrode layers 131b and 132b, wherein an angle formed by a growth direction V1 of the first crystal grain and extension lines E3 and E4 of the third or fourth surface is referred to as a second angle θ1, and an angle formed by a growth direction V2 of the second crystal grain and the extension lines E3 and E4 is referred to as a second angle θ1, an absolute value of a difference between an average value of the first angle θ1 and an average value of the second angle θ2 is 20 degrees or less.

The body 110 has a dielectric layer 111 and internal electrodes 121 and 122, alternately stacked therein.

The body 110 is not limited to a particular shape, and may have a hexahedral shape or a shape similar to the hexahedral shape, as illustrated in the drawings. The body 110 may not have the shape of a hexahedron having perfectly straight lines because ceramic powder particles included in the body 110 are contracted in a process in which the body is sintered. However, the body 110 may have a substantially hexahedral shape.

The body 110 may have first and second surfaces 1 and 2 opposing each other in a first direction, third and fourth surfaces 3 and 4 connected to the first and second surfaces 1 and 2 and opposing each other in a second direction, and fifth and sixth surfaces 5 and 6 connected to the first and second surfaces 1 and 2, connected to the third and fourth surfaces 3 and 4, and opposing each other in a third direction.

A plurality of dielectric layers 111 forming the body 110 may be in a sintered state, and adjacent dielectric layers 111 may be integrated with each other, such that boundaries therebetween may not be readily apparent without a scanning electron microscope (SEM).

According to an embodiment of the present disclosure, a raw material for forming the dielectric layer 111 is not particularly limited, as long as sufficient electrostatic capacitance may be obtained therewith. For example, the raw material for forming the dielectric layer 111 may be a barium titanate ($BaTiO_3$)-based material, a lead composite perovskite-based material, a strontium titanate ($SrTiO_3$)-based material, or the like. The barium titanate-based material may include $BaTiO_3$-based ceramic powder, and the ceramic powder may be, for example, $BaTiO_3$, $(Ba_{1-x}Ca_x)TiO_3$, $Ba(Ti_{1-y}Ca_y)O_3$, $(Ba_{1-x}Ca_x)(Ti_{1-y}Zr_y)O_3$ or $Ba(Ti_{1-y}Zr_y)O_3$, in which calcium (Ca), zirconium (Zr), or the like, are partially dissolved in $BaTiO_3$, and the like.

In addition, a raw material of the dielectric layer 111 may include various ceramic additives, organic solvents, binders, dispersants, and the like, added to powder particles such as barium titanate ($BaTiO_3$) powder particles, or the like, according to an object of the present disclosure.

Meanwhile, an average thickness "td" of the dielectric layer 111 is not particularly limited. For example, the average thickness "td" of the dielectric layer 111 may be 0.2 µm or more and 2 µm less. However, in general, when the dielectric layer is formed thinly to a thickness of less than 0.6 µm, in particular, when the thickness of the dielectric layer is 0.35 µm or less, reliability of the multilayer electronic component 100 may be further deteriorated.

According to an embodiment of the present disclosure, by adjusting an absolute value of a difference between an average value of a first angle θ1 and a second angle θ2, to be described later, even when the average thickness "td" of the dielectric layer 111 is 0.35 µm or less, reliability of the multilayer electronic component 100 may be secured. That is, when the average thickness "td" of the dielectric layer 111 is 0.35 µm or less, a reliability improvement effect according to the present disclosure may be more remarkable.

The average thickness "td" of the dielectric layer 111 may refer to an average thickness "td" of the dielectric layer 111 disposed between the first and second internal electrodes 121 and 122.

The average thickness "td" of the dielectric layer 111 may be measured by scanning an image of a cross-section of the body 110 in length and thickness directions (L-T directions) with a scanning electron microscope (SEM) with a magnification of 10,000. More specifically, an average value may be measured by measuring a thickness of one dielectric layer at 30 equally spaced points in the length direction from the scanned image. The 30 points having equal intervals may be designated in the capacitance formation portion Ac. In addition, if the average value is measured by extending the average value measurement to 10 dielectric layers, the average thickness of the dielectric layers can be more generalized.

The body 110 may include a capacitance formation portion Ac disposed inside the body 110 and including a first internal electrode 121 and a second internal electrode 122 alternately disposed with the dielectric layer 111 interposed therebetween to form capacitance and cover portions 112 and 113 formed above and below the capacitance formation portion Ac in a first direction.

In addition, the capacitance formation portion Ac is a portion contributing to forming capacitance of the capacitor, may be formed by repeatedly stacking a plurality of first and second internal electrodes 121 and 122 with a dielectric layer 111 interposed therebetween.

In an embodiment, an upper cover portion 112 may be disposed on one surface of the capacitance formation portion Ac in a first direction, and a lower cover portion 113 may be disposed on the other surface of the capacitance formation portion Ac in the first direction.

The upper cover portion 112 and the lower cover portion 113 may be formed by stacking a single dielectric layer or two or more dielectric layers on the upper and lower surfaces of the capacitance formation portion Ac in a thickness direction, respectively, and the upper cover portion 112 and the lower cover portion 113 may serve to basically prevent damage to the internal electrodes due to physical or chemical stress.

The upper cover portion 112 and the lower cover portion 113 may not include internal electrodes, and may include the same material as that of the dielectric layer 111.

That is, the upper cover portion 112 and the lower cover portion 113 may include a ceramic material, for example, a barium titanate ($BaTiO_3$)-based ceramic material.

Meanwhile, an average thickness of the cover portions 112 and 113 is not particularly limited. However, in order to more easily implement miniaturization and high capacitance of the multilayer electronic component, the average thickness "tc" of the cover portions 112 and 113 may be 15 µm or less. In addition, according to an embodiment of the present disclosure, by adjusting an absolute value of a difference between an average value of a first angle θ1 and an average value of a second angle θ2, to be described later, to 20 degrees or less, even when the average thickness "tc" of the cover portion is 15 µm or less, the reliability of the multilayer electronic component 100 may be secured.

The average thickness of the cover portions 112 and 113 may refer to a size thereof in the first direction, and may be a value obtained by averaging sizes of the cover portions 112 and 113 measured at five points having equal intervals in the first direction above or below the capacitance formation portion Ac.

In an embodiment, margin portions 114 and 115 may be disposed on a side surface of the capacitance formation portion Ac.

Referring to FIG. 2, the margin portions 114 and 115 may include a margin portion 114 disposed on the fifth surface 5 of the body 110 and a margin portion 115 disposed on the sixth surface 6 thereof. That is, the margin portions 114 and 115 may be disposed on both end surfaces of the body in a third direction (width direction).

The margin portions 114 and 115 may refer to a region between both ends of the first and second internal electrodes 121 and 122 and an interface of the body 110, in a cross-section of the body 110 cut in width-thickness (W-T) directions, as illustrated in FIG. 3.

The margin portions 114 and 115 may basically serve to prevent damages to the internal electrodes due to physical or chemical stresses.

The margin portions 114 and 115 may be formed by applying a conductive paste to a ceramic green sheet, except where margin portions are to be formed, to form internal electrodes.

In addition, in order to suppress a step by the internal electrodes 121 and 122, after the internal electrodes are cut so as to be exposed to the fifth and sixth surfaces 5 and 6 of the body after lamination, the margin portions 114 and 115 may also be formed by stacking a single dielectric layer or two or more dielectric layers on both side surfaces of the capacitance formation portion Ac in the third direction (width direction).

Meanwhile, a width of the margin portions 114 and 115 is not particularly limited. However, in order to more easily implement miniaturization and high capacitance of the multilayer electronic component, the average width of the margin portions 114 and 115 may be 15 µm or less. In addition, according to an embodiment of the present disclosure, by adjusting an absolute value of a difference between an average value of the first angle θ1 and an average value of the second angle θ2 to 20 degrees or less, even when an average width of the margin portions 114 and 115 is 15 µm or less, the reliability of the multilayer electronic component 100 may be secured.

The average width of the marginal portions 114 and 115 may refer to an average size of the marginal portions 114 and 115 in a third direction, and may be a value obtained by averaging sizes of the margin portions 114 and 115 measured at five points having equal intervals in the third direction on the side surface of the capacitance formation portion Ac.

The internal electrodes 121 and 122 and the dielectric layer 111 are alternately disposed in a first direction.

The internal electrodes 121 and 122 may include first and second internal electrodes 121 and 122. The first and second internal electrodes 121 and 122 may be alternately disposed to oppose each other with the dielectric layer 111 constituting the body 110 interposed therebetween, and may be respectively connected to the third and fourth surfaces 3 and 4 of the body 110. Specifically, one end of the first internal electrode 121 may be connected to the third surface, and one end of the second internal electrode 122 may be connected to the fourth surface. That is, the internal electrodes 121 and 122 in an embodiment may be in contact with the third surface 3 or the fourth surface 4.

The first internal electrode 121 may be spaced apart from the fourth surface 4 and exposed through the third surface 3, and the second internal electrode 122 may be spaced apart from the third surface 3 and exposed through the fourth surface 4. A first external electrode 131 may be disposed on the third surface 3 of the body and connected to the first internal electrode 121, and a second external electrode 132 may be disposed on the fourth surface 4 and connected to the second internal electrode 122.

That is, the first internal electrode 121 may be connected to the first external electrode 131 without being connected to the second external electrode 132, and the second internal electrode 122 may be connected to the second external electrode 132 without being connected to the first external electrode 132. Accordingly, the first internal electrode 121 may be formed to be spaced apart from the fourth surface 4 by a predetermined distance, and the second internal electrode 122 may be formed to be spaced apart from the third surface 3 by a predetermined distance.

In this case, the first aid second internal electrodes 121 and 122 may be electrically isolated from each other by the dielectric layer 111 disposed in a middle.

The body 110 may be formed by alternately stacking a ceramic green sheet on which the first internal electrode 121 is printed and a ceramic green sheet on which the second internal electrode 122 is printed, and then sintering the same.

A material for forming internal electrodes 121 and 122 is not particularly limited, and a material having excellent electrical conductivity may be used. For example, the internal electrodes 121 and 122 may include at least one of nickel (Ni), copper (Cu), palladium (Pd), silver (Ag), gold (Au), platinum (Pt), tin (Sn), or tungsten (W), titanium (Ti), and alloys thereof.

In addition, the internal electrodes 121 and 122 may be formed by printing a conductive paste for internal electrodes including at least one of nickel (Ni), copper (Cu), palladium (Pd), silver (Ag), gold (Au), platinum (Pt), tin (Sn), tungsten (W), and alloys thereof, on a ceramic green sheet. A method of printing the conductive paste for internal electrodes may be a screen printing method, a gravure printing method, or the like, but the present disclosure is not limited thereto.

In addition, an average thickness "te" of the internal electrodes 121 and 122 is not particularly limited. For example, the average thickness "te" of the internal electrodes 121 and 122 may be 0.2 μm or more and 2 μm less.

However, in general, when internal electrodes are formed thinly to a thickness of less than 0.6 μm, and particularly when the thickness of internal electrodes is 0.35 μm or less, reliability of the multilayer electronic component 100 may be more problematic.

According to an embodiment of the present disclosure, by adjusting an absolute value of a difference between an average value of a first angle θ1 and an average value of a second angle θ2 to be described later, to 20 degrees or less, even when the average thickness "te" of the internal electrodes 121 and 122, reliability may be improved.

Therefore, when the average thickness of the internal electrodes 121 and 122 is 0.35 μm or less, the effect according to the present disclosure may be more remarkable, and miniaturization and high capacitance of the multilayer electronic component may be more easily achieved.

The average thickness "te" of the internal electrodes 121 and 122 may refer to an average thickness "te" of the internal electrodes 121 and 122.

The average thickness "te" of the internal electrodes 121 and 122 may be measured by scanning an image of a cross-section of the body 110 in length and thickness directions (L-T) with a scanning electron microscope (SEM) at a magnification of 10,000. More specifically, an average value may be measured by measuring a thickness of one of the internal electrodes at 30 equally spaced points in the length direction in the scanned image. The 30 equally spaced points may be designated in the capacitance formation portion Ac. In addition, if the average value is measured by extending the average value measurement to 10 internal electrodes, the average thickness of the internal electrodes can be more generalized.

First electrode layers 131a and 132a disposed between an extension line E1 of the first surface and an extension line E2 of the second surface are disposed on the third and fourth surfaces 3 and 4 of the body 110. The first electrode layer is in contact with and electrically connected to the internal electrodes 121 and 122. In detail, the first electrode layer 131a is in contact with and electrically connected to the first internal electrode 121, and the first electrode layer 132a is in contact with and electrically connected to the second internal electrode 122.

The first electrode layers 131a and 132a may include a conductive metal element, which may serve to secure connectivity with the internal electrodes 121 and 122. The type of conductive metal element is not particularly limited, and the first electrode layers 131a and 132a may include at least one of Cu, Ni, Pd, Cr, and alloys thereof, and first crystal grains G1 and G1' and second crystal grains G2 and G2' to be described later may include at least one of Cu, Ni, Pd, Cr, and alloys thereof.

In an embodiment of the present disclosure, among a plurality of crystal grains included in the first electrode layers 131a and 132a, crystal grains disposed on an end of the dielectric layer 111 in a second direction and in contact with the second electrode layers 131b and 132b may be defined as first crystal grains G1 and G1' and crystal grains disposed on ends of the internal electrodes 121 and 122 in the second direction and in contact with the second electrode layers 131b and 132b may be defined as second crystal grains G2 and G2', and a growth direction V1 of the first crystal grains G1 and G1' and a growth direction V2 of the second crystal grains G2 and G2' may be adjusted so that bonding force between the first electrode layers 131a and 132a may be improved. Specifically, in an embodiment of the present disclosure, when an angle formed by the growth direction V1 of the first crystal grains and extension lines E3 and E4 of the third surface or fourth surface is referred to as a first angle θ1, and an angle formed by the growth direction V2 of the second crystal grains and the extension lines E3 and E4 of the third or fourth surface is referred to as a second angle θ2, an absolute value of a difference between the average value of the first angle θ1 and the average value of the second angle θ2 is 20 degrees or less.

In an embodiment of the present disclosure, both of the first crystal grains G1 and G1' and the second crystal grains G2 and G2' included in the first electrode layers 131a and 132a may have an elongated shape extending in a direction substantially parallel to the second direction between the third surface 3 and fourth surface 4 of the body 110 and an inner surface of the second electrode layers 131b and 132b, respectively.

Hereinafter, the first and second crystal grains G1, G1', G2, and G2', growth directions V1 and V2 of the first and second crystal grains, and first and second angles θ1 and θ2 will be described in detail with reference to the second internal electrode 122, the first electrode layer 132a, and the second electrode layer 132b. This description can be similarly applied with reference to the first internal electrode 122, the first electrode layer 131a, and the second electrode layer 131b.

A method of measuring the growth directions V1, V1', V2, and V2' of the first and second crystal grains and the first and second angles θ1 and θ2 is not particularly limited. For example, in a cross-section of the multilayer electronic component 100 in first and second directions, cut from a central portion thereof in a third direction, growth directions V1, V1', V2, and V2' of first and second crystal grains and first and second angles θ1 and θ2 were measured by processing a region of 20 μm×20 μm or more with a focused ion beam (FIB) based on a surface in which an internal electrode disposed at the top or bottom of the internal electrodes 121 and 122 in the first direction and first and second electrode layers 131a and 132a are in contact with each other, and then performing scanning electron microscope (SEM) analysis thereon.

FIG. 5 is an enlarged view of the P1 region of FIG. 2, and FIGS. 6 (a) and 6 (b) are schematic diagrams schematically illustrating a method of measuring a growth direction of a first crystal grain and a growth direction of a second crystal grain according to an embodiment of the present disclosure.

Referring to FIG. 5, the first electrode layers 131a and 132a may include a plurality of crystal grains. The plurality of crystal grains may have a form in which grain growth progresses from the fourth surface 4 of the body toward the second electrode layer 132b. Accordingly, among the plurality of crystal grains, sizes of crystal grains in contact with the second electrode layers 131b and 132b may be greater than sizes thereof in contact with the fourth surface 4, and in an embodiment, the sizes of the plurality of crystal sizes may gradually increase from the fourth surface 4 to the second electrode layers 131b and 132b.

In an embodiment of the present disclosure, among a plurality of crystal grains included in the first electrode layers 131a and 132a, crystal grains in contact with the second electrode layers 131b and 132b are defined as first and second crystal grains G1, G1', G2, and G2'. In addition, among the first and second crystal grains G1, G1', G2, and G2', crystal grains disposed on an end of the dielectric layer 111 in a second direction are defined as first crystal grains G1 and G1', and crystal grains disposed on an end of the internal electrode 122 in the second direction are defined as second crystal grains G2 and G2'. In this case, crystal grains simultaneously disposed on the end of the dielectric layer 111 in the second direction and the end of the internal electrode 122 in the second direction are defined as second crystal grains G2 and G2'.

Figure 6A:
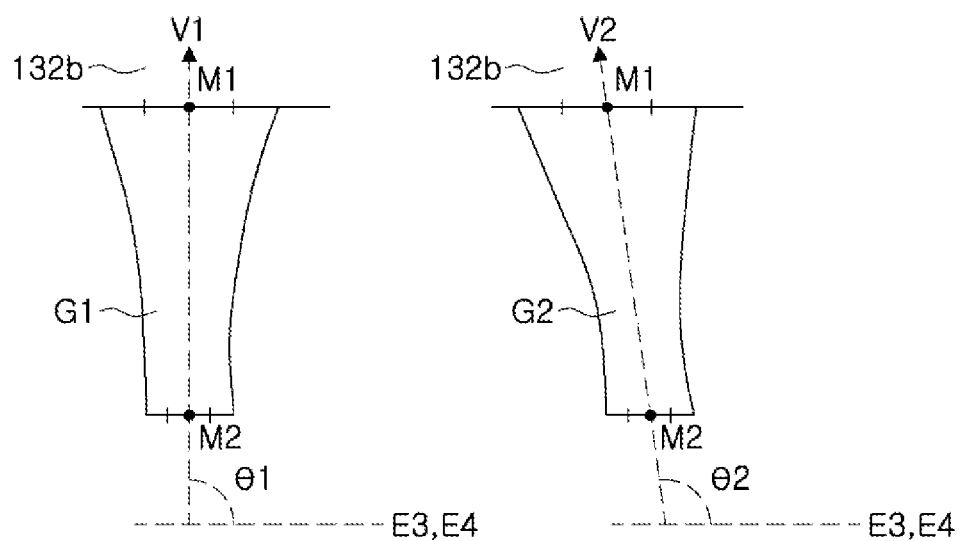
FIGS. 6 (*a*) and 6(*b*) are schematic diagrams schematically illustrating a method of measuring a growth direction of a first crystal grain and a growth direction of a second crystal grain according to an embodiment of the present disclosure.
Figure 6B:
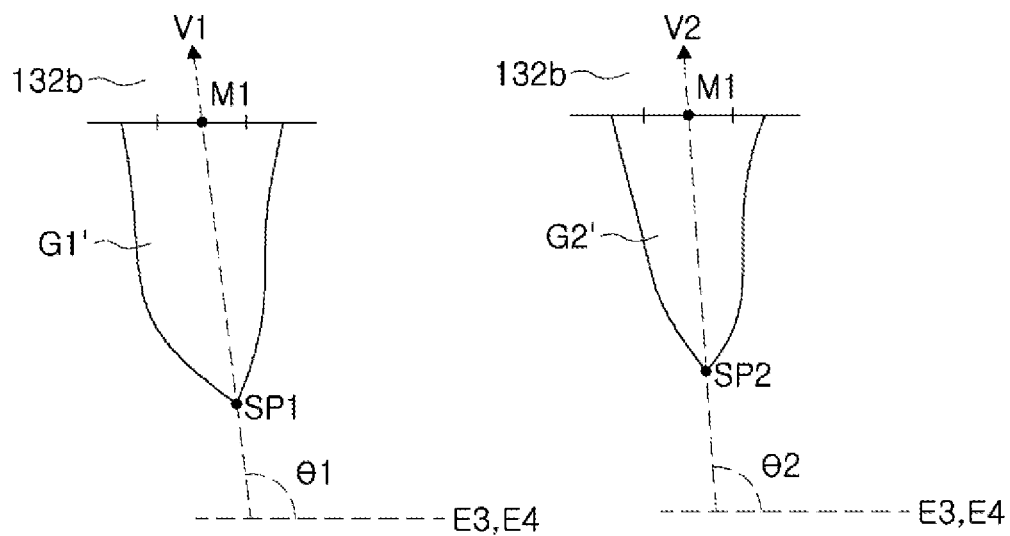

Referring to FIGS. 6(a) and 6(b), in an embodiment of the present disclosure, "the growth directions V1 and V2 of the first and second crystal grains G1 and G2" may refer to, in the first and second crystal grains G1 and G2, a direction of a straight line connecting a midpoint M1 of an uppermost line segment in a second direction, in contact with the second electrode layer 132b and a midpoint M2 of a lowermost line segment in the second direction, in contact with the second electrode layer 132b. Meanwhile, the first and second crystal grains G1' and G2' may have a sharp point located at the bottom according to grain growth conditions. In this case, the "growth directions V1 and V2 of the first and second crystal grains" may refer to, in the first and second crystal grains G1' and G2', a direction of a straight line connecting a midpoint M1 of an uppermost line segment in the second direction in contact with the second electrode layer 132b and lowermost sharp points SP1 and SP2 thereof.

According to an embodiment of the present disclosure, an angle formed by the growth direction V1 of the first crystal grain and extension lines E3 and E4 of the third or fourth surface is defined as a first angle θ1, and an angle formed by the growth direction V2 of the second crystal grain V2 and the extension lines E3 and E4 of the third surface or fourth surface is defined as a second angle θ2. According to an embodiment of the present disclosure, an absolute value of a difference between an average value of the first angle θ1 and an average value of the second angle θ2 is preferably degrees or less. Through this, bonding force between the end of the dielectric layer 111 in the second direction and the first electrode layers 131a and 132a may be improved, so that the high-temperature and moisture resistance reliability of the multilayer electronic component 100 may be improved.

The average value of the first angle θ1 may refer to an average value of the first angle θ1 values measured from five or more of the arbitrary first crystal grains G1 and G1', and the average value of the second angle θ2 may refer to an average value of second angle values θ2 measured from five or more of the arbitrary second crystal grains G2 and G2'. The average value of the first angle θ1 and the average value of the second angle θ2 can be further generalized by measuring in five or more arbitrary regions equally spaced in the first direction from the P1 region, and the arbitrary five or more regions equally spaced from the P1 region in the first direction may have substantially the same area as the P1 region, and substantially the same pre-treatment may be performed.

A method of adjusting the average value of the first angle θ1 and the average value of the second angle θ2 is not particularly limited. In an embodiment, the end of the dielectric layer 111 in the second direction may be selectively reduced through a high-power laser on the third and fourth surfaces 3 and 4 of the body 110 and an electrolytic plating method or an electroless plating method may be used on the third and fourth surfaces 3 and 4 thereof, so that first electrode layers 131a and 132a may be formed. Thus, the average value of the first angle θ1 and the average value of the second angle θ2 may be adjusted.

In the conventional case of forming a first electrode layer using an electrolytic plating method or an electroless plating method on the third and fourth surfaces 3 and 4 without reducing an end of the dielectric layer 111 in the second direction, grain growth of conductive metal does not occur smoothly at the end of the dielectric layer 111 in the second direction, which has a ceramic raw material as a main component thereof, so that a large difference may occur in the growth directions of the crystal grains of the first electrode layer disposed on the end of the dielectric layer 111 in the second direction and the crystal grains of the second electrode layer disposed on the ends of the internal electrodes 121 and 122 in the second direction. In this case, when an absolute value of a difference between the average value of the first angle θ1 and the average value of the second angle θ2 is calculated as in an embodiment of the present disclosure, a difference of more than 20 degrees may occur, and sufficient bonding force between the body 110 and the first electrode layer may not be improved, and thus high temperature and moisture resistance of the multilayer electronic component may be deteriorated.

Therefore, according to an embodiment of the present disclosure, when the absolute value of the difference between the average value of the first angle θ1 and the average value of the second angle θ2 is adjusted to 20 degrees or less, the high temperature and moisture resistance reliability of the multilayer electronic component 100 may be improved by improving the bonding force between the end of the dielectric layer 111 in the second direction and the first electrode layers 131a and 132a.

In an embodiment, the growth direction V1 of the first crystal grain and the growth direction V2 of the second crystal grain may be substantially the same. Accordingly, by minimizing a difference in crystal growth directions between the crystal grains of the first electrode layer disposed on the end of the dielectric layer 111 in the second direction and the crystal grains of the second electrode layer disposed on the ends of the internal electrodes 121 and 122 in the second direction, high temperature and moisture resistance reliability of the multilayer electronic component 100 may be further improved. In this case, the fact that the growth direction V1 of the first crystal grain and the crystal growth direction V2 of the second crystal grain are substantially the same refers to that an absolute value of the difference between the average value of the first angle θ1 and the average value of the second angle θ2 is 15 degrees or less.

A method of forming the first electrode layers 131a and 132a is not particularly limited, but preferably, thin and dense first electrode layers 131a and 132a may be formed on the third and fourth surfaces 3 and 4 of the body 110 using an electroplating or electroless plating method. That is, in an embodiment, the first electrode layers 131a and 132a may not include glass. When glass is not included in the first electrode layers 131a and 132a, on the third and fourth surfaces 3 and 4, the end of the dielectric layer 111 in the second direction and the first electrode layers 131a and 132a may have a problem that bonding strength is deteriorated due to a difference in components. However, since the bonding force between the first electrode layers 131a and 132a and the body is improved by adjusting the growth direction V1 of the first crystal grain and the growth direction V2 of the second crystal grain as in an embodiment of the present disclosure, even when the first electrode layers 131a and 132a do not include glass, the bonding force between the body 110Q and the first electrode layers 131a and 132a can be sufficiently improved.

Second electrode layers 131b and 132b are disposed on the first electrode layers 131a and 132a.

The second electrode layers 131b and 132b may serve to secure plating properties and mountability, and may serve to protect the multilayer electronic component 100 from external impact.

In an embodiment, the second electrode layers 131b and 132b may include glass and may further include at least one of Cu, Ni, Ag, Sn, Cr, Pd, and alloys thereof. Accordingly, by forming a plating layer on the second electrode layers 131b and 132b, oxidation of the first electrode layers 131a and 132a can be prevented and mountability can be secured. In an embodiment, the second electrode layers 131b and 132b may be disposed to extend from the first electrode layers 131a and 132a to a portion of at least one of the first, second, fifth, and sixth surfaces 1, 2, 5, and 6 of the body 110. Accordingly, a sufficient mounting area can be secured.

Figure 7:
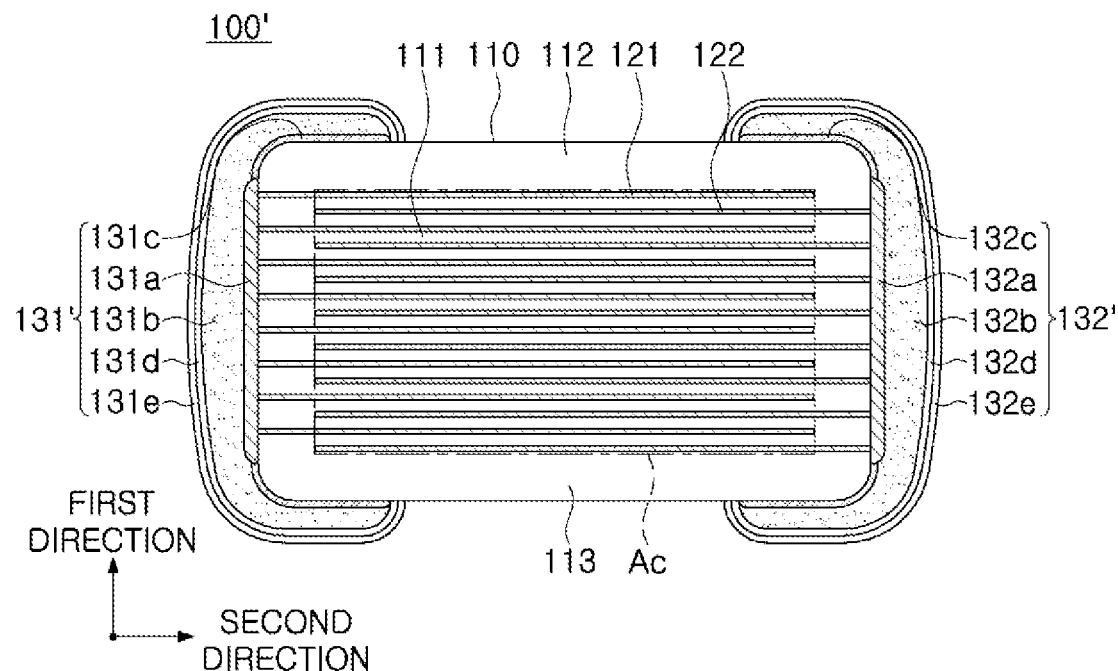
FIG. 7 is a cross-sectional view of a multilayer electronic component in first and second directions according to an embodiment.

FIG. 7 is cross-sectional view of a multilayer electronic component 100' in first and second directions according to an embodiment.

Referring to FIG. 7, in the multilayer electronic component 100' according to an embodiment, protective layers 131c and 132c may be disposed on the third and fourth surfaces not covered by the first and second electrode layers 131a and 132a and an interface of the second electrode layers 131b and 132b. The protective layers 131c and 132c may include glass, and the glass included in the protective layers 131c and 132c may be one in which the glass included in the second electrode layers 131b and 132b move to the third and fourth surfaces and the interface of the second electrode layers 131b and 132b. The protective layers 131c and 132c may be formed on third and fourth surfaces on which the internal electrodes 121 and 122 are not disposed, and may be formed on an interface in which the cover portions 112 and 113 and the margin portions 114 and 115 are in contact with the second electrode layers 131b and 132b.

Meanwhile, since a ratio of glass is relatively small on surfaces of the second electrode layers 131b and 132b and a ratio of metal is increased thereon, plating properties can be improved. Specifically, in an embodiment, the content of the glass included in the second electrode layers 131b and 132b may gradually decrease from the interface between the body 110 and the second electrode layers 131b and 132b to outer surfaces of the second electrode layers 131b and 132b.

Figure 8:
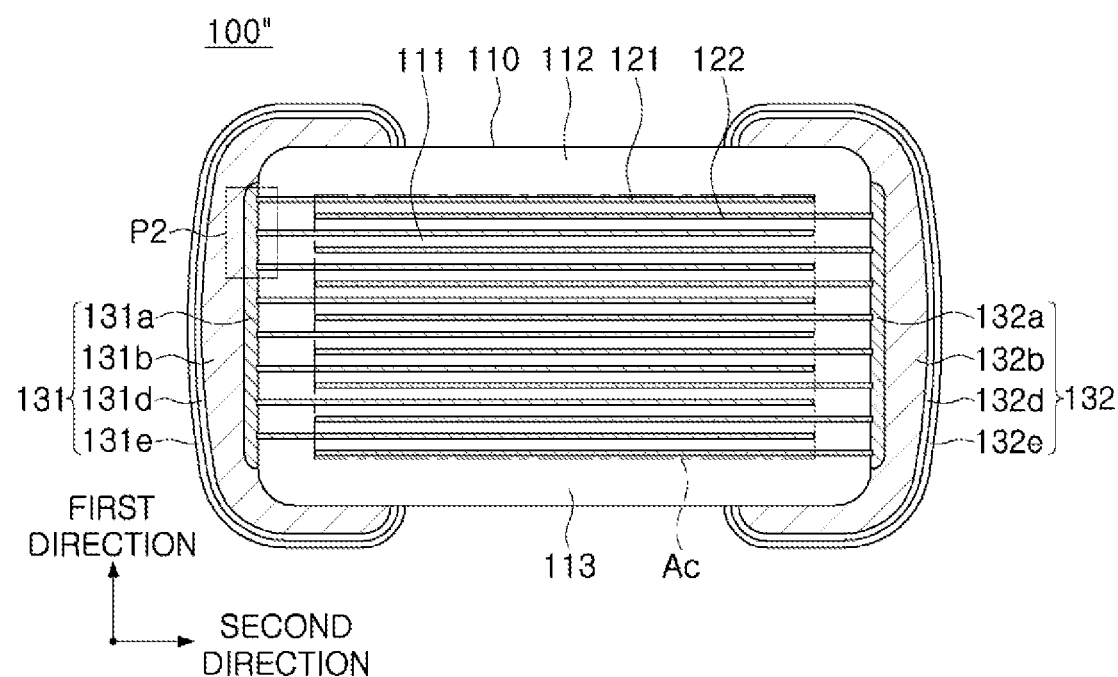
FIG. 8 is a cross-sectional view of a multilayer electronic component in first and second directions according to an embodiment.
Figure 9:
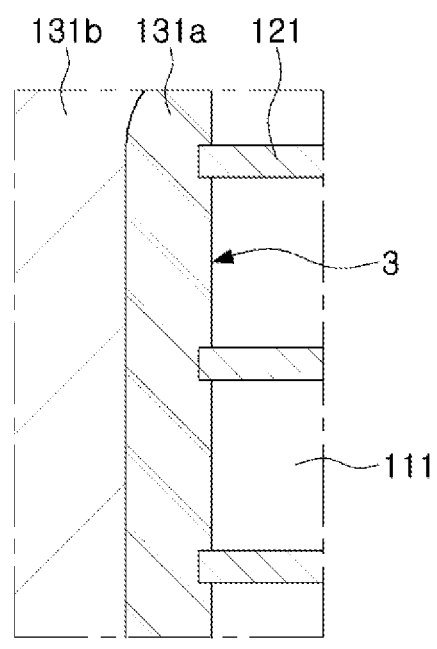
FIG. 9 is an enlarged view of region P2 of FIG. 8.

FIG. 8 is cross-sectional view of a multilayer electronic component 100" in first and second directions according to an embodiment, and FIG. 9 is an enlarged view of a region P2 of FIG. 8.

Referring to FIGS. 8 and 9, the multilayer electronic component 100" according to an embodiment may have a shape protruding from the third and fourth surfaces 3 and 4 of the body in a second direction. Accordingly, by improving a contact area between the first electrode layers 131a and 132a and ends of the internal electrodes 121 and 122 in the second direction, and further improving the bonding force between the first electrode layers 131a and 132a and the body 110, high temperature and moisture resistance reliability of the multilayer electronic component 100" can be further improved. In addition, as the first electrode layers 131a and 132a are disposed to cover the protruding ends of the internal electrodes, an effect of improving high-temperature and moisture resistance reliability may be more remarkable. In FIG. 9, the protruding shape of the first internal electrode 121 is expressed with respect to the third surface 3, but the protruding shape of the second internal electrode 122 with respect to the fourth surface 4 may also be understood in the same manner.

The first electrode layers 131a and 132a and the second electrode layers 131b and 132b described above may constitute external electrodes 131 and 132. In addition, the first electrode layers 131a and 132a, the second electrode layers 131b and 132b, and the protective layers 131c and 132c may also constitute external electrodes 131' and 132'. However, the protective layers 131c and 132c may not be essential components of the present disclosure, and it should be noted that it does not mean the external electrodes 131 and 132 include only the first electrode layers 131a and 132a and the second electrode layers 131b and 132b, That is, the external electrodes 131 and 132 may include plating layers 131d, 131e, 132d, and/or 132e on the second electrode layers 131b and 132b, respectively, and the plating layer serves to improve mounting properties. The type of the plating layer is not particularly limited, and may be a plating layer including at least one of Ni, Sn, Pd, and alloys thereof, and may be formed of a plurality of layers. For a more specific example of the plating layer, the plating layer may be a Ni plating layer 131d/132d or a Sn plating layer 131e/132e, may have a form in which a Ni plating layer 131d/132d and a Sn plating layer 131e/132e are sequentially formed on the electrode layer, and have a form in which a Sn plating layer, a Ni plating layer, and a Sn plating layer are sequentially formed. In addition, the plating layer may include a plurality of Ni plating layers and/or a plurality of Sn plating layers.

Meanwhile, the second electrode layers 131b and 132b may include conductive metal and a resin. Accordingly, the multilayer electronic component 100 can be protected from stress caused by warpage of an external substrate or stress caused by solder reflow. The type of the resin is not particularly limited, and may be a resin having ductility and strong heat resistance. For example, the resin may be a phenolic resin, urea resin, diallylphthalate resin, melanin resin, guanamine resin, unsaturated polyester resin, polyurethane resin, epoxy resin, acrylic resin, ethyl cellulose resin, aminoalkyd resin, melamine-urea copolymer resin, silicon resin, polysiloxane resin, and the like, but an embodiment thereof is not limited thereto. In the case of using a resin, a curing agent such as a crosslinking agent, a polymerization initiator, and the like, may be further added as needed.

In the present embodiment, a structure in which the multilayer electronic component 100 has two external electrodes 131 and 132 is described, but the number and shape of the external electrodes 131 and 132 may be changed according to the shape of the internal electrodes 121 and 122 or other purposes.

A size of the multilayer electronic component 100 is not particularly limited.

However, in order to achieve miniaturization and high capacitance at the same time, the thickness of the dielectric layer and internal electrodes should be thinned to increase the number of stacked layers thereof, so that an adhesion strength improvement effect according to the present disclosure may be more remarkable in the multilayer electronic component 100 having a size of 0603 (length×width, 0.6 mm×0.3 mm) or less.

Accordingly, when the length of the multilayer electronic component. 100 is 0.66 mm or less and the width thereof is 0.33 mm or less, considering manufacturing errors, sizes of external electrodes, and the like, the adhesion strength improvement effect according to the present invention may be more remarkable. Here, a length of the multilayer electronic component 100 may refer to a maximum size of the multilayer electronic component 100 in the second direction, and a width of the multilayer electronic component 100 may refer to a maximum size of the multilayer electronic component 100 in the third direction.

Example

Table 1 shows results of evaluation of high-temperature reliability and moisture resistance reliability according to an absolute value of a difference between an average value $\overline{\Theta 1}$ of a first angle $\theta 1$ and an average value $\overline{\Theta 2}$ of a second angle $\theta 2$ according to an embodiment of the present disclosure.

The average value $\overline{\Theta 1}$ of the first angle $\theta 1$ and the average value $\overline{\Theta 2}$ of the second angle $\theta 2$ were adjusted by changing a condition for selectively reducing an end of the dielectric layer 111 in a second direction, and other than that, conditions were equally applied to all samples.

In a cross-section of the sample of the multilayer electronic component 100 in first and second directions, cut from a central portion thereof in a third direction, growth directions V1, V1', V2, and V2' of first and second crystal grains and first and second angles $\theta 1$ and $\theta 2$ were measured by processing a region of 20 μm×20 μm or more with a focused ion beam (FIB) based on a surface in which an internal electrode disposed at the top or bottom of the internal electrodes 121 and 122 in the first direction and first and second electrode layers 131a and 132a are in contact with each other, and then performing scanning electron microscope (SEM) analysis thereon.

Specifically, among the first and second crystal grains G1 and G2, a direction of a straight line connecting a midpoint M1 of an uppermost line segment and a midpoint M2 of a lowermost line segment, in contact with the second electrode layer 132b, was measured as the growth directions V1 and V2 of the first and second crystal grains. Meanwhile, first and second crystal grains G1' and G2' may have a sharp point located at the bottom according to grain growth conditions. In this case, in the first and second crystal grains G1' and G2', a direction of a straight line connecting the midpoint M1 of the uppermost lone segment in the second direction, contacting the second electrode layer 132b and the lowermost sharp points SP1 and SP2 was measured as crystal growth directions V1 and V2 of the first and second crystal grains. Thereafter, an angle formed by the growth direction V1 of the first crystal grain and extension lines E3 and E4 of the third surface or the fourth surface was measured as a first angle $\theta 1$, and an angle formed by the growth direction V2 of the second crystal grain and extension lines E3 and E4 of the third surface or the fourth surface was measured as a second angle $\theta 2$.

Meanwhile, an average value ($\overline{\Theta 1}$) of the first angle $\theta 1$ was taken from a value of the first angle $\theta 1$, measured from five or more crystal grains among random first crystal grains G1 and G1', and an average value ($\overline{\Theta 1}$) of the second angle $\theta 2$ was taken from a value of the first angle $\theta 1$, measured from five or more crystal grains among random first crystal grains G2 and G2'.

High-temperature reliability evaluation was conducted for 12 hours at 105° C. and 1 Vr, and moisture resistance evaluation was conducted for 24 hours at 95° C., 95% relative humidity and 0.6 Vr, and the high-temperature reliability evaluation and the moisture resistance evaluation were conducted with 1200 samples for each test number. A case in which a value of insulation resistance (IR) measured at an evaluation completion point was lowered by $10^3 \Omega$ or more, as compared to an initial point thereof, was evaluated as a defective product.

TABLE 1

| Test No. | $\|\overline{\Theta 1} - \overline{\Theta 2}\|_{(°)}$ | High-temperature reliability (the number of defective products/the number of samples) | Moisture resistance reliability (the number of defective products/the number of samples) |
|---|---|---|---|
| 1 | 16 | 1/1200 | 0/1200 |
| 2 | 20 | 1/1200 | 0/1200 |
| 3 | 26 | 4/1200 | 6/1200 |
| 4 | 29 | 5/1200 | 5/1200 |

Test Nos. 1 and 2 are cases in which a value of $|\overline{\Theta 1} - \overline{\Theta 2}|$ is 20 degrees or less, and it can be confirmed that high-temperature reliability and moisture resistance reliability are excellent.

Test Nos. 3 and 4 are cases in which a value of $|\overline{\Theta 1} - \overline{\Theta 2}|$ exceeds 20 degrees, and it can be confirmed that high-temperature reliability and moisture resistance reliability are deteriorated.

Therefore, in an embodiment of the present disclosure, by adjusting the absolute value ($|\overline{\Theta 1} - \overline{\Theta 2}|$) of the difference between the average value of the first angle and the average value of the second angle to be 20 degrees or less, high-temperature reliability and moisture resistance reliability of the multilayer electronic component may be improved.

As set forth above, as one of the various effects of the present disclosure, when a first electrode layer including crystal grains is formed on third and fourth surfaces of the body, by adjusting an angle formed by a growth direction of the crystal grains and extension lines of the third and fourth surfaces, to improve bonding force between the first electrode layer and the body, moisture resistance and high-temperature reliability of the multilayer electronic component may be improved.

However, the various advantageous advantages and effects of the present disclosure are not limited to the above description, and will be more easily understood in the process of describing specific embodiments of the present disclosure.

Although the embodiments of the present disclosure have been described in detail above, the present disclosure is not limited by the above-described embodiments and the accompanying drawings, and is intended to be limited by the appended claims. Therefore, various forms of substitution, modification, and change will be possible by those skilled in the art within the scope of the technical spirit of the present disclosure described in the claims, which also falls within the scope of the present disclosure.

In addition, the expression 'one embodiment' used in the present disclosure does not refer to the same embodiment, and is provided to emphasize and describe different unique characteristics. However, one embodiment presented above is not excluded from being implemented in combination with features of another embodiment. For example, even if a matter described in one specific embodiment is not described in another embodiment, it can be understood as a description related to another embodiment, unless there is a description contradicting or contradicting the matter in the other embodiment.

Terms used in this disclosure are only used to describe one embodiment, and are not intended to limit the disclosure. In this case, singular expressions include plural expressions unless the context clearly indicates otherwise.

While example embodiments have been shown and described above, it will be apparent to those skilled in the art that modifications and variations could be made without departing from the scope of the present invention as defined by the appended claims.

What is claimed is:

1. A multilayer electronic component, comprising:
a body including a dielectric layer and internal electrodes alternately disposed with the dielectric layer interposed therebetween in a first direction, the body having first and second surfaces opposing each other in the first direction, third and fourth surfaces connected to the first and second surfaces and opposing each other in a second direction, and fifth and sixth surfaces connected to the first to fourth surfaces and opposing each other in a third direction;
a first electrode layer disposed on the third and fourth surfaces, and disposed between an extension line of the first surface and an extension line of the second surface; and
a second electrode layer disposed on the first electrode layer,
wherein the first electrode layer includes a first crystal grain disposed on an end of the dielectric layer in the second direction and in contact with the second electrode layer and a second crystal grain disposed on ends of the internal electrodes in the second direction and in contact with the second electrode layer, and
wherein, when an angle formed by a growth direction of the first crystal grain and an extension line of the third surface or the fourth surface is referred to as a first angle and an angle formed by a growth direction of the second crystal grain and an extension line of the third surface or the fourth surface is referred to as a second angle, an absolute value of a difference between an average value of the first angle and an average value of the second angle is degrees or less.

2. The multilayer electronic component of claim 1, wherein the growth direction of the first crystal grain and the growth direction of the second crystal grain are substantially the same.

3. The multilayer electronic component of claim 1, wherein the growth directions of the first and second crystal grains is a direction of a straight line connecting a midpoint of an uppermost line segment and a midpoint of a lowermost line segment in the second direction of the first and second crystal grains, in contact with the second electrode layer, or a direction of a straight line connecting a midpoint of an uppermost line segment and a sharp point of a lowermost line segment point in the second direction of the first and second crystal grains, in contact with the second crystal grains.

4. The multilayer electronic component of claim 1, wherein the first electrode layer does not include glass.

5. The multilayer electronic component of claim 1, wherein the first and second crystal grains include at least one of Cu, Ni, Pd, Cr, and alloys thereof.

6. The multilayer electronic component of claim 1, wherein the second electrode layer is disposed to extend from the first electrode layer onto a portion of at least one of the first, second, fifth, and sixth surfaces.

7. The multilayer electronic component of claim 6, wherein the second electrode layer includes glass, and a content of glass included in the second electrode layer gradually decreases from an interface between the body and the second electrode layer to an outer surface of the second electrode layer.

8. The multilayer electronic component of claim 1, wherein the second electrode layer comprises glass, further comprising at least one of Cu, Ni, Ag, Sn, Cr, Pd, and alloys thereof.

9. The multilayer electronic component of claim 1, wherein a protective layer including glass is disposed on an interface between the third and fourth surfaces, not covered by the first electrode layer, and the second electrode layer.

10. The multilayer electronic component of claim 1, wherein the second electrode layer includes a conductive metal and a resin.

11. The multilayer electronic component of claim 10, wherein the resin includes at least one of epoxy, acrylic, or ethyl cellulose.

12. The multilayer electronic component of claim 1, wherein a plating layer is disposed on the second electrode layer.

13. The multilayer electronic component of claim 1, wherein each internal electrode is in contact with the third surface or fourth surface.

14. The multilayer electronic component of claim 1, wherein the internal electrodes have a shape protruding from the third and fourth surfaces in the second direction.

15. The multilayer electronic component of claim 14, wherein the first electrode layer is disposed to cover protruding ends of the internal electrodes, such that the protruding ends of the internal electrodes are embedded in the first electrode layer.

16. A multilayer electronic component, comprising:
a body including a dielectric layer and internal electrodes alternately disposed with the dielectric layer interposed therebetween in a first direction, the body having first and second surfaces opposing each other in the first direction, third and fourth surfaces connected to the first and second surfaces and opposing each other in a second direction, and fifth and sixth surfaces connected to the first to fourth surfaces and opposing each other in a third direction;
a first electrode layer disposed on the third and fourth surfaces; and
a second electrode layer disposed on the first electrode layer,
wherein the first electrode layer includes a first crystal grain disposed on an end of the dielectric layer in the second direction and in contact with the second electrode layer and a second crystal grain disposed on ends of the internal electrodes in the second direction and in contact with the second electrode layer, both of the first crystal grain and the second crystal grain have an elongated shape extending in a direction substantially parallel to the second direction between the third or fourth surface of the body and an inner surface of the second electrode layer.

17. The multilayer electronic component of claim 16, wherein
when an angle formed by a growth direction of the first crystal grain and an extension line of the third surface or the fourth surface is referred to as a first angle and an angle formed by a growth direction of the second crystal grain and an extension line of the third surface or the fourth surface is referred to as a second angle, an absolute value of a difference between an average value of the first angle and an average value of the second angle is 20 degrees or less.

18. The multilayer electronic component of claim 17, wherein the growth directions of the first and second crystal grains is a direction of a straight line connecting a midpoint of an uppermost line segment and a midpoint of a lowermost line segment in the second direction of the first and second crystal grains, in contact with the second electrode layer, or a direction of a straight line connecting a midpoint of an uppermost line segment and a sharp point of a lowermost line segment point in the second direction of the first and second crystal grains, in contact with the second crystal grains.

19. The multilayer electronic component of claim 16, wherein the first electrode layer does not include glass.

20. The multilayer electronic component of claim 16, wherein the second electrode layer includes glass, and a content of glass included in a portion of the second electrode layer closer to an interface between the body and the second electrode layer is greater than to a content of glass included in another portion of the second electrode layer closer to an outer surface of the second electrode layer.

* * * * *